United States Patent [19]

Kuzyk et al.

[11] Patent Number: 4,690,546
[45] Date of Patent: Sep. 1, 1987

[54] APPARATUS FOR PRODUCING INTERNEGATIVES

[75] Inventors: Roman Kuzyk, Trenton, N.J.; Richard H. Bender, Gaithersburg, Md.; Lew Edwards, Orlando, Fla.

[73] Assignee: ECB Technologies, Inc., Washington, D.C.

[21] Appl. No.: 903,478

[22] Filed: Sep. 4, 1986

[51] Int. Cl.$^4$ .............................................. G03B 27/72
[52] U.S. Cl. ....................................... 355/69; 355/68; 355/70
[58] Field of Search ............................... 355/68, 69, 70

[56] References Cited

U.S. PATENT DOCUMENTS

| | | | |
|---|---|---|---|
| 3,060,796 | 10/1962 | Muse | 355/69 |
| 3,308,716 | 3/1967 | Caporael | 355/69 |
| 3,645,620 | 2/1972 | Jaffe | 355/69 |
| 3,754,825 | 8/1973 | Sorli et al. | 355/69 |
| 4,043,662 | 8/1977 | Garfall | 355/69 |

FOREIGN PATENT DOCUMENTS 1460895 10/1966 France ................................ 355/69

*Primary Examiner*—Monroe H. Hayes
*Attorney, Agent, or Firm*—Cushman, Darby & Cushman

[57] ABSTRACT

An apparatus for producing internegatives includes a slide holder for positioning the slide from which the internegative is to made, a primary photoflash unit for back-illuminating the slide and projecting the image thereof into a camera, a secondary photoflash unit for directing a contrast correction exposure into the camera via a reflecting plate, and a stored programed controlled processor for controlling the time duration of the primary exposure, the contrast correction exposure, and the operation of the camera so as to properly exposure the film in the camera. A back-illuminated light screen is provided to allow the operator to evaluate the brightness of the slide so as to control the duration of the primary exposure and the contrast correction to consistently produce properly exposed internegatives.

25 Claims, 8 Drawing Figures

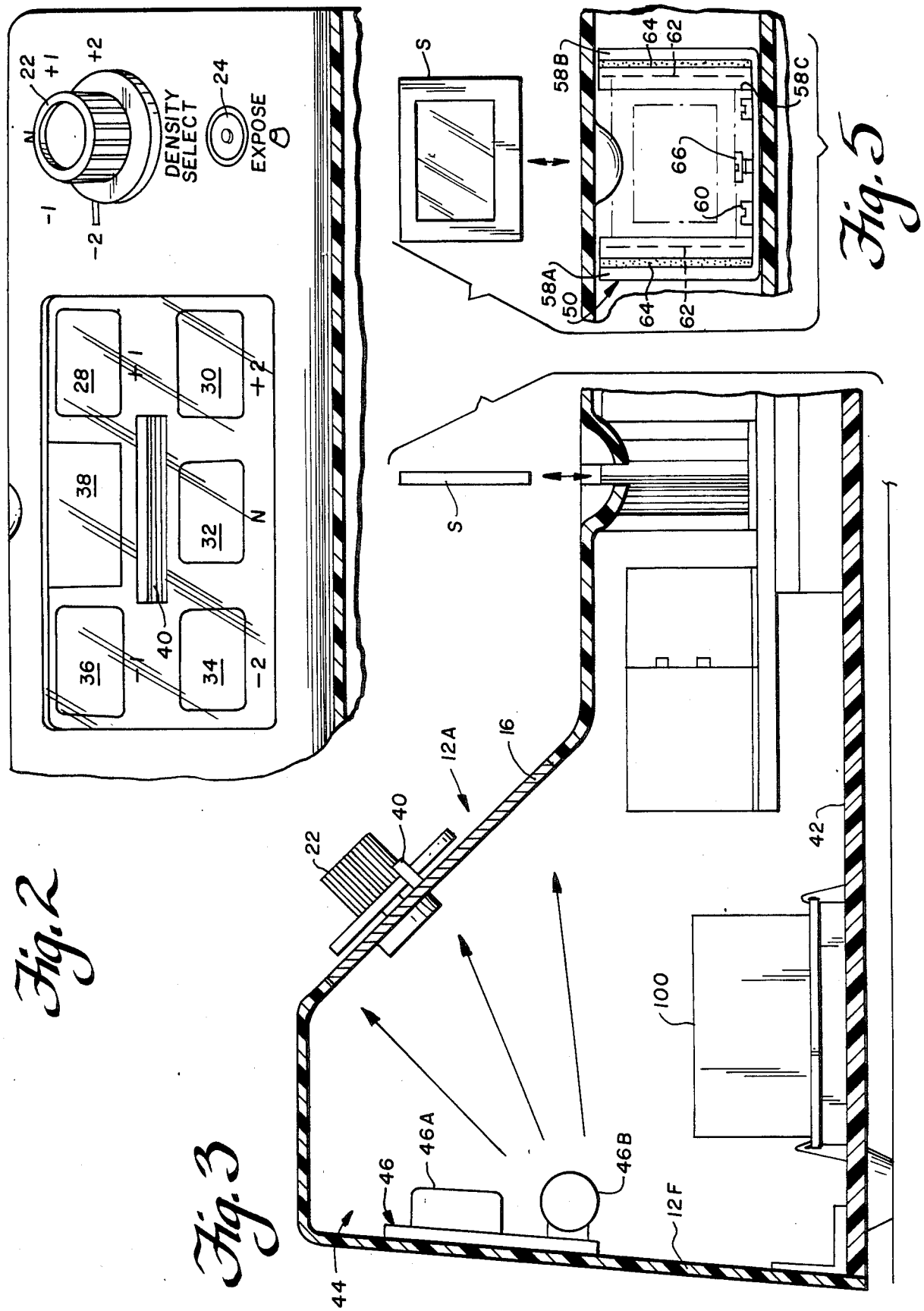

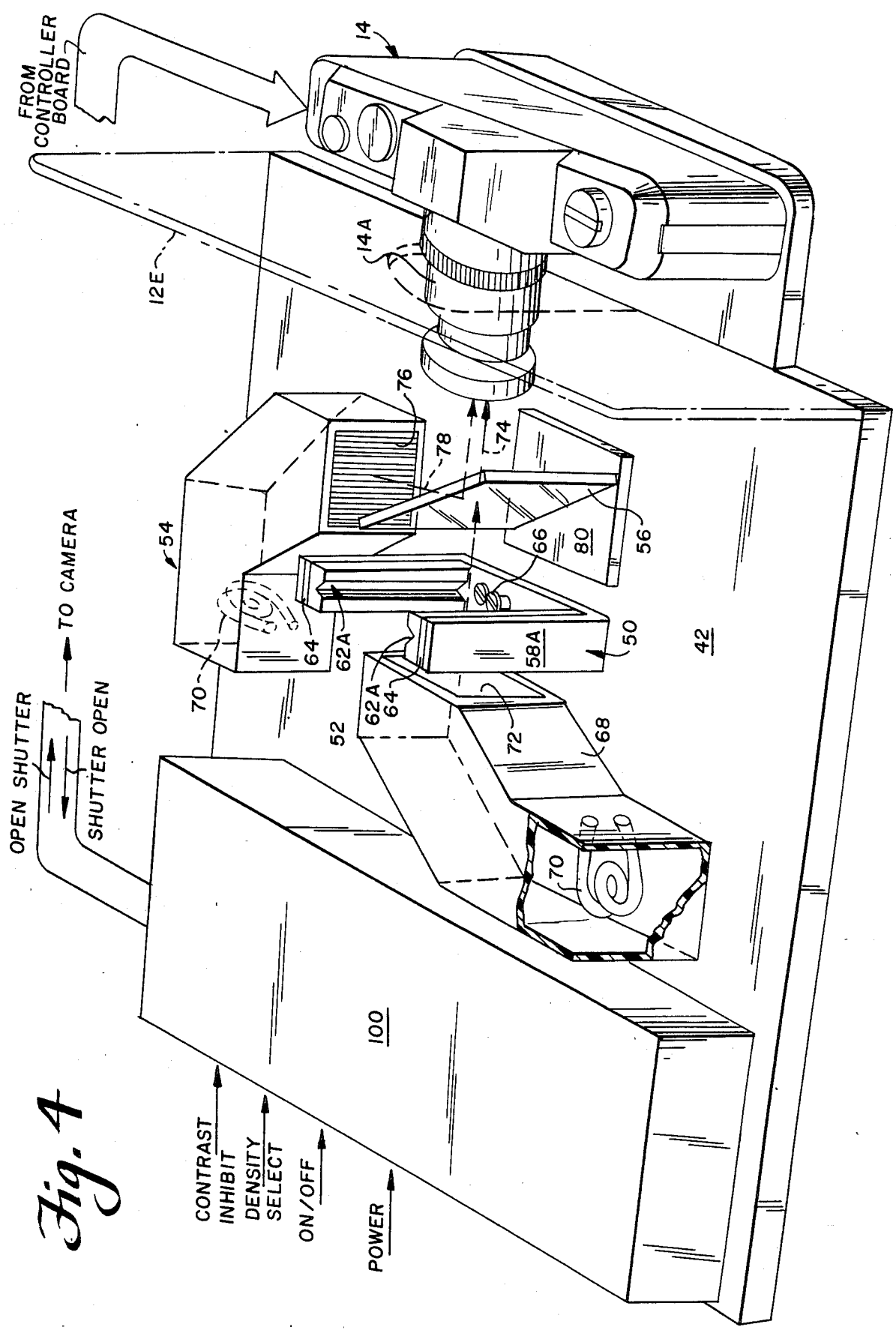

APPARATUS FOR PRODUCING INTERNEGATIVES

BACKGROUND OF THE INVENTION

The present invention relates to the production of internegatives from transparencies and, more particularly, to apparatus for producing internegatives in which the resulting internegative is optimally exposed to the original image and corrected for contrast as part of the exposure process.

In order to produce a photoprint of a transparency, the conventional practice is to illuminate the transparency from the rear and photograph the back-illuminated transparency with a conventional camera. The exposed film is then developed to yield a negative, viz., the internegative, which is then used to produce a photographic print.

While various types of equipment have been developed for the purpose of exposing an internegative as part of the above described process, a typical arrangement uses an illuminated copy table upon which the slide transparency is placed and through which light from the underlying table passes. A conventional camera, typically equipped with a bellows and lens, is mounted above the copy table so as to allow photographing of the image presented by the back-illuminated slide. A specially designed 'internegative' film, which has a lower contrast than conventional films, is used, and filters must be provided with the light source to correct for undesired spectral components in the illumination. The low-contrast internegative film is required since the process of effecting a photograph of the back-illuminated transparency with normal film increases the contrast of the resulting image; the low-contrast internegative film thus functions to compensate for this effect. When conventional contrast films are used, the increased-contrast effect results in a loss of detail in the resulting image, particularly in the shadow and highlight areas of the image. If conventional film is used, the contrast can be lowered by a second exposure to a minute, but calculated quantity of diffuse light energy which has the effect of slightly fogging the resulting image and reducing the undesired increment in contrast. In this latter situation, the camera operator must first determine the parameters for the initial exposure of the image, effect the exposure, determine the parameters the contrast-correcting exposure, and then effect the second exposure.

As can be appreciated, the equipment and process steps described above are quite involved and require a fair degree of skill on the part of the operator. In those situations where conventional contrast film is used and contrast correction is effected by another exposure to a source of diffuse light, considerable care must be exercised to avoid overexposure of the image and an unacceptable internegative. In an effort to maximize the probability of an acceptable internegative, many exposures at differing aperture settings and exposure times must be made so that at least one of the resulting internegatives may be satisfactory. Such a practice, of course, is inefficient from the standpoint of time and cost.

SUMMARY OF THE INVENTION

It is a principal object of the present invention, among others, is to provide an apparatus for producing internegatives that is compact in size and more efficient in terms of cost and time than prior devices.

It is another object of the present invention to provide an apparatus for producing an internegative which utilizes conventional contrast photographic film to produce the internegative.

It is another object of the present invention to provide an apparatus for producing an internegative in which the exposure of the internegative is dependent upon, in part, the perceived brightness of the transparency from which the internegative to be made.

It is another object of the present invention to provide an apparatus for producing an internegative in which the exposure of the internegative is effected in such a way that a contrast correction is provided to correct for any increase in the density of the internegative.

It is another object of the present invention to provide an apparatus for producing an internegative in which the required skill level of the operator is minimal so as to increase operating efficiency and lower operating costs.

In accordance with these objects, and others, an apparatus for producing internegatives includes a self-centering slide holder for holding the slide from which the internegative is made, a primary photoflash unit for back-illuminating the slide and projecting the image thereof into a camera, a secondary photoflash unit for directing contrast correction light into the camera via a reflecting plate, and a stored-programed controlled microprocessor for controlling the time duration of the primary exposure and the contrast correction exposure and the operation of the camera so as to properly exposure the negative film in the camera.

In the preferred embodiment, the apparatus for producing internegatives includes a housing having a back-illuminated light screen with exemplary photographic scenes indicating the brightness of an exposure two stops above and below an optimal exposure. The operator visually compares the brightness of the subject of principal interest in the slide to the exemplary scenes and enters the selected value through an 'exposure (density) select' control. The slide is then passed through a slide access slot in the apparatus and positioned in the slide holder which is effective to maintain the slide in a desired position relative to the camera in which the internegative film is loaded. A primary flash unit is mounted so as to back-illuminate the slide with the image thereof passing into the camera to effect primary exposure. The duration of the primary flash exposure is controlled by a microprocessor as a function of the selected density value. After the primary exposure is effected, a secondary flash unit is operated to direct diffused, white light into the camera to lower the contrast of the internegative image and to compensate for the undesired contrast-increasing effect of the internegative exposure process. The secondary flash exposure is selectively inhibited depending upon the density value previously selected so as to optimally expose the internegative. The light from the secondary flash is reflected into the camera by a transparent reflecting plate located in the light path of the primary flash unit.

The present invention advantageously provides an apparatus for producing internegatives that is compact in size compared to prior arrangements and which can be operated by relatively unskilled operators to produce internegatives in a time and cost efficient manner.

A principal object of the present invention is, therefore, the provision of an improved apparatus for producing internegative in which a properly exposed internegative can be produced by a relatively untrained operator and in a time and cost efficient manner. Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 2 is a frontal view of an operator console portion of the apparatus shown in FIG. 1 including a light screen for ascertaining the relative brightness of a slide transparency from which the internegative is to be made and related controls and switches;

FIG. 3 is a side elevational view, in cross section, of a portion of the internegative apparatus illustrating the manner by which the light screen is back illuminated;

FIG. 4 is an isometric view of the optical components of the internegative apparatus of FIG. 1;

FIG. 5 is a front elevational view of an auto-centering slide holder of FIG. 4;

DESCRIPTION OF THE PREFERRED EMBODIMENT

Figure 1:
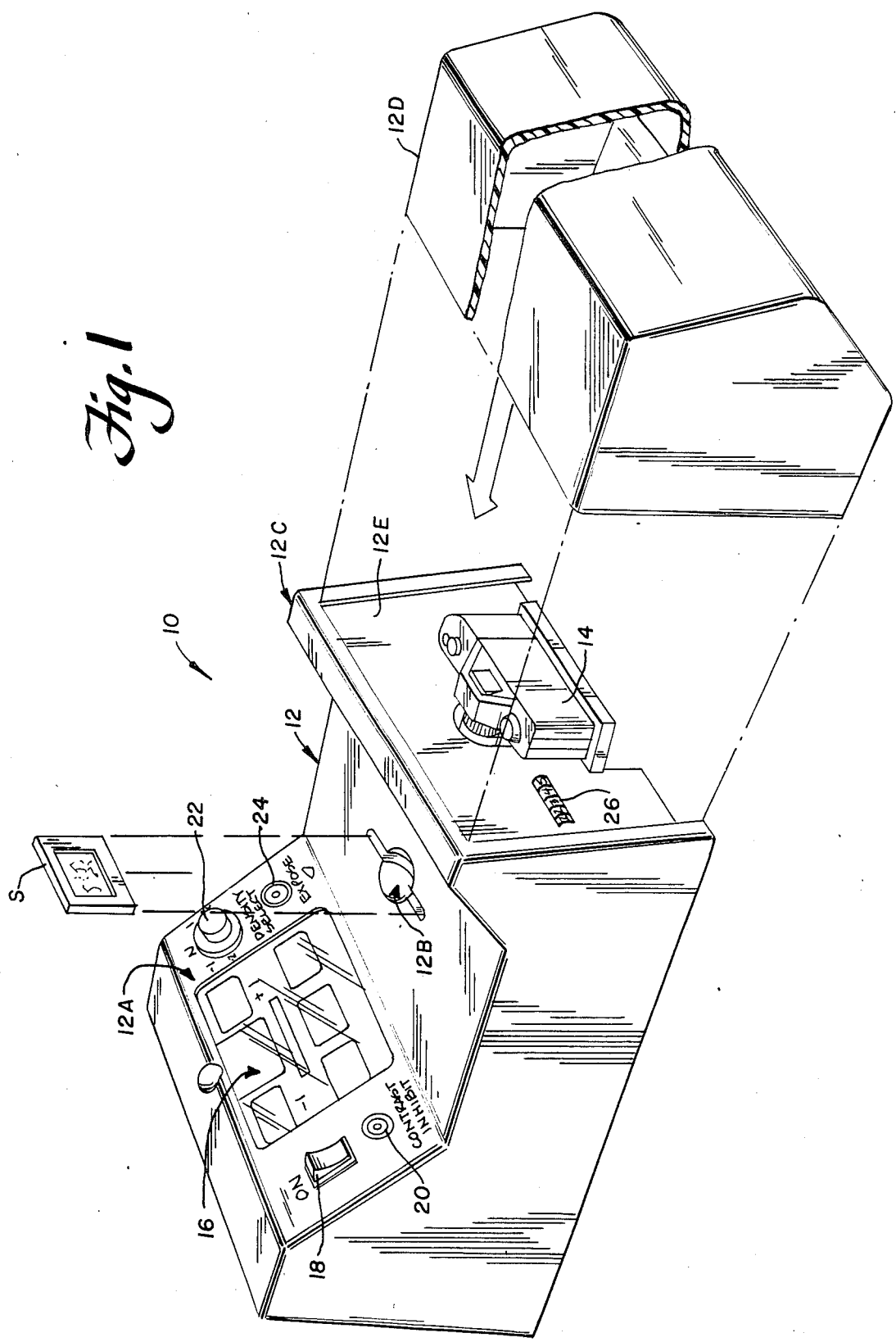
FIG. 1 is a partially exploded isometric view of an internegative apparatus in accordance with the present invention.

A preferred embodiment of an internegative apparatus in accordance with the present invention is shown in FIG. 1 and designated generally therein by the reference character 10. As shown, the internegative apparatus 10 includes a housing 12, preferably formed from a molded plastic, having an upwardly facing surface that includes, at the rear portion of the housing 12, an inclined operator console 12A, a generally horizontally aligned intermediate portion that includes a slide access slot 12B, and a forwardly facing potion 12C that includes a removable cover 12D beneath which an electronically actuated camera 14 is mounted. An exemplary slide "S", which is a 35 mm. transparency mounted in a conventional cardboard or plastic mount, is shown positioned above the slide access slot 12B. A back-illuminated light screen 16 is positioned on the operator console 12A with an ON/OFF power switch 18 and a 'Contrast Inhibit' switch 20 to the left of the light screen 16 and a multi-position 'Density Select' switch 22 and an 'Expose' switch 24 to the right of the light screen 16. An incrementable counter 26 is mounted to the left of the camera 14 on an internal partition 12E to count the total number of operating cycles of the internegative apparatus 10.

The light screen 16 is fabricated from a light transmitting material such as glass or plastic and, as shown in FIG. 2, its surface is divided into six zones or areas 28, 30, 32, 34, and 36 which are provided with sample photographic scenes representative of, respectively, scenes that are overexposed by one stop (+1), overexposed by two stops (+2), properly exposed (N), underexposed by two stops (−2), and underexposed by one stop (−1). Lastly, an area 38, without a sample photographic image, is provided between the areas 36 and 28. A ledge 40 is provided below the area 38 for supporting the slide "S" in general registration therewith to permit the operator to conveniently compare the brightness of the image presented by the slide "S" with the brightness of the sample photographic scenes of the areas 28, 30, 32, 34, and 36. Once the relative brightness of the slide "S", particularly the subject of principal interest, is determined by the operator, the value is entered using the 'Density Select' switch 22, as described more fully below.

As shown in the cross sectional view of FIG. 3, the housing 12 is mounted upon a base plate 42 to define a light chamber 44 between the inclined operator console 12A and a rear panel 12F of the housing 12. An illumination unit 46 is mounted to the interior of the rear panel 12F and includes a power supply 46A for supplying electric power to a lamp 46B. The light output of the lamp 46B allows proper comparison of the slide "S" and the sample photographic scenes and serves to backlight the light screen 16 to allow a brightness comparison to be made by the operator of the internegative apparatus 10. In the preferred embodiment, the lamp 46B is a fluorescent tube having a length at least coincident with the width of the light screen 16, a Sylvania F6 T5/WW lamp being suitable. Electrical power is supplied to the lamp 46B in response to operation of the ON/OFF switch 18 in the usual manner.

The optical components of the internegative apparatus 10 are mounted upon the base plate 42 and, as shown in FIG. 4, include the camera 14, a auto-centering slide holder 50, a primary light mixing unit 52, a secondary light mixing unit 54, and a reflector plate 56. A controller 100, fabricated as a printed circuit board, is mounted adjacent the primary light mixing unit 52 and effects control of the primary light mixing unit 52, the secondary light mixing unit 54, and the camera 14 as described more fully below.

The slide holder 50, as shown in FIG. 4 and the detail of FIG. 5, is formed from a U-shaped bracket 58 having spaced apart, upstanding legs 58A and 58B interconnected by an intermediate portion 58C and secured to the base plate 42 by suitable fasteners 60. Guide blocks 62, each having a V-groove 62A formed on one side thereof are mounted to respective legs, 58A and 58B, of the bracket 58 through resilient elastomer pads 64. The guide blocks 62 and their elastomer pads 64 are preferably secured together and to the bracket legs 58A and 58B using a suitable adhesive. An alignment screw 66, in threaded engagement with the base plate 42, is provided to allow adjustment of the position of the slide "S" relative the base plate 42. As can be appreciated from FIGS. 4 and 5, a slide "S" can be inserted through the slide access slot 12B and into the opposed V-grooves 62A of the guide blocks 62 with the resilient pads 64 causing the slide "S" to self-align, regardless of the mount thickness, within the grooves 62A at a vertical position controlled by the alignment screw 66.

The primary light mixing unit 52 is defined by a housing 68, preferably fabricated from a molded plastic and having the general configuration shown, which forms a closed, hollow chamber. A flash tube 70 is positioned at one end of the housing 68 and a flat, translucent exit panel 72 is positioned at the other end. The flash tube 70 is positioned in the housing 68 so that its light output does not directly irradiate the exit panel 72. The interior surfaces of the housing 68 are preferably a non-reflecting white so that the light output of the flash tube 70 is fully mixed to a uniform intensity distribution at the light exit panel 72. Additionally, the light exit panel 72 is formed from a white, translucent material so that light from the flash tube 70 exiting the primary light mixing unit 52 is uniformly diffused. The light output of the primary light mixing unit 52 serves to back-illuminate a slide "S" mounted in the slide holder 50 with the image thereof projected along the axis 74 and through the reflecting plate 56 into and through a lens 14A of the camera 14 to expose the internegative film, as described below.

The secondary light mixing unit 54 is structurally similar to primary light mixing unit 52 and includes a flash tube (not specifically illustrated) that provides light to a light exit panel 76. In contrast to the primary light mixing unit 52, the exit panel 76 of the secondary light mixing unit 54 consists of a translucent diffusing panel similar to the panel 72 of the primary light mixing unit 52, and, additionally, a light-absorbing filter that serves to attenuate the intensity of the light exiting the secondary light mixing unit 54. The light exiting the secondary light mixing unit 54 is directed to the reflecting plate 56 for reflection through the lens 14A into the camera 14 as represented generally by the axis 78.

The reflector plate 56 functions to allow transmission of the image of the back-illuminated slide "S" carried in the slide holder 50 generally along the axis 74 into the camera 14 and reflection of the light output from the secondary light mixing unit 54 generally along the axis 78 into the camera 14. In general, a transparent glass plate, having flat planar surfaces to minimize image degradation, is suitable for the reflector plate 56. While the reflector 56 serves the purpose of reflecting light from the secondary light mixing unit 52 into the camera 14, an anti-halation layer (not shown) is preferably applied to the side of the reflector plate 56 facing the slide holder 50. The reflector plate 56 is preferably carried in a slotted mounting block 80 secured to the top surface of the base plate 42 and aligned at an angle of about 45° relative to the axis 74.

The camera 14 is secured to a forward extension of the base plate 42 by suitable fasteners (not specifically shown) with the partition 12E (shown in broken line illustration in FIG. 4) functioning as a light shield separating the camera body from the above described optical components.

The camera 14 is preferably a conventional 35 mm. camera of the type that has an automatic shutter operating cycle that can be initiated by a single control pulse and which then runs to completion under its own internal operating cycle, an autowind feature that advances the film one frame at the completion of the shutter operating cycle, and, lastly, provision for sending a 'shutter open' signal. This latter signal is generally available at a 'sync' output for controlling conventional photoflash units. While a number of cameras having these attributes are suitable, preferred cameras include the Cannon model T50 camera equipped with a flat field 1:1 lens 14A for receiving the image of the back-illuminated slide "S".

The controller board 100 includes a power supply for providing power to the various components of the system, photoflash drive circuits that accumulate an electrical charge for exciting the photoflash tubes 70, control circuitry responsive to a trigger signal to discharge a photoflash tube for a selected duration, and a stored program controlled processor for effecting overall control in the manner described below.

Figure 6:
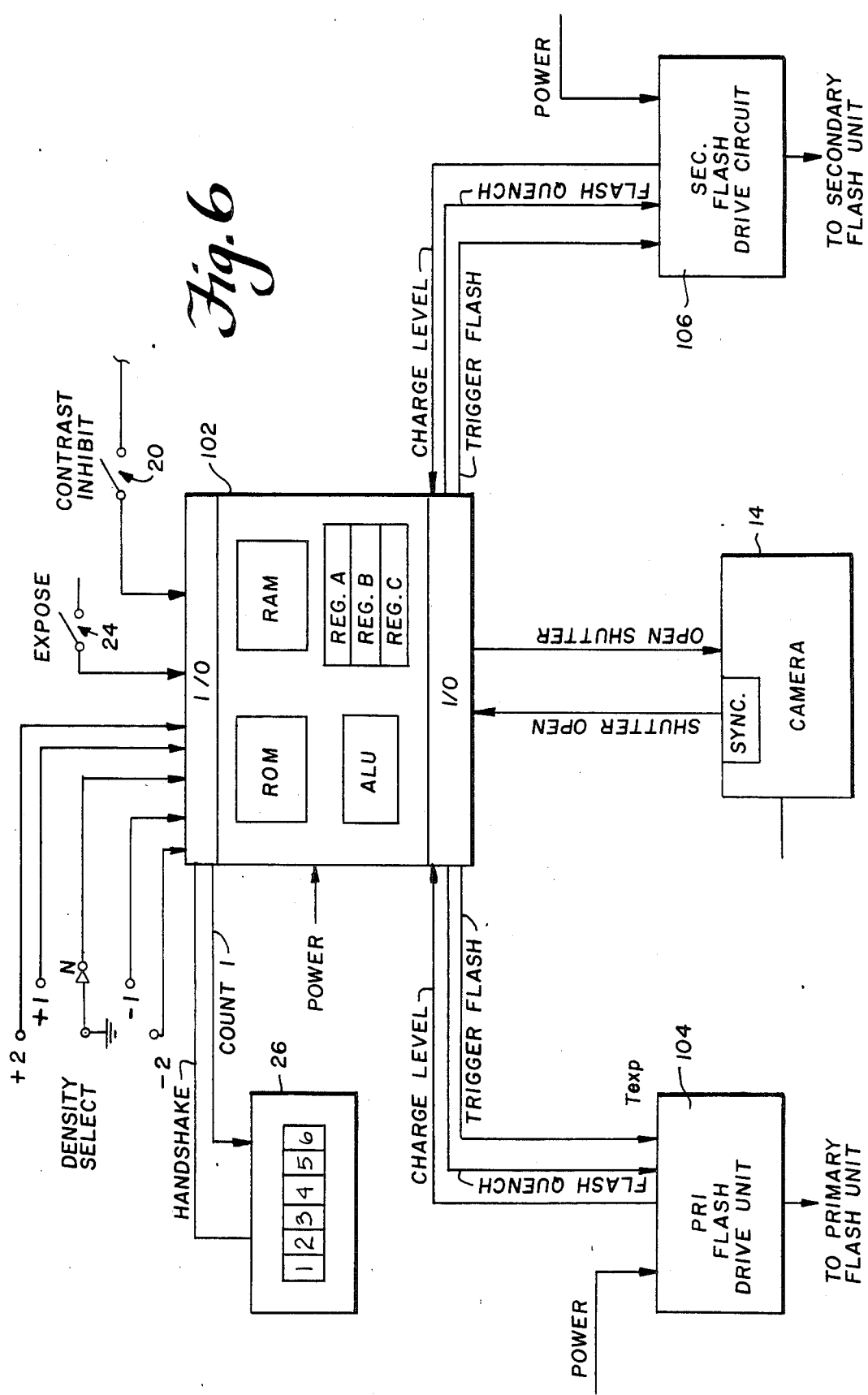
FIG. 6 is a functional block diagram of a stored program controlled microprocessor, primary and secondary photoflash units, and a camera component of the internegative apparatus of FIGS. 1 and 4.

As shown in FIG. 6, the controller board 100 architecture includes a stored program controlled processor 102, preferably of the 1-chip type, a first controllable flash tube drive circuit 104 for driving the primary light mixing unit 52, and a second controllable flash tube drive circuit 106 for driving the secondary light mixing unit 54. The camera 14 is connected to the processor 102 through an 'open shutter' and a 'shutter open' control line, and the incrementable counter 26 is connected through a 'count 1' signal line. Additionally, the 'Density Select' switch 22, which is 5-position rotary switch in the preferred embodiment, the 'Expose' switch 24, and the 'Contrast Inhibit' switch 20 are likewise connected to the processor 102.

The processor 102 includes an arithmetic logic unit, one or more registers for manipulating data, a read-only-memory (ROM) for storing an instruction set, a random-access memory (RAM) for temporary storage of operating parameters and the like, and input/output ports I/O for accepting various input control signals and information and outputting control signals to the various controlled devices. In the preferred embodiment, the stored program controlled processor 102 is selected from the MC68705 family of 8-bit EPROM microcomputers manufactured by Motorola Semiconductor Products, Inc. of Austin, Tex. 78721 and is preferably a MC68705R3 microcomputer which includes a CPU, on-chip clock, an EPROM for the programmed instruction set described below in relationship to FIGS. 7A and 7B, ROM, RAM, and an analog-to-digital converter for sensing analog voltages.

The flash tube drive circuits 104 and 106 are of conventional design in that a power supply provides a charge voltage (e.g. 350 VDC) to a capacitive storage device which accumulates a charge sufficient to excite the flash tubes 70 for the desired duration. A trigger signal provided through a pulse transformer causes the flash tube 70 to go into conduction and discharge the capacitive storage device. Additionally, circuitry and related devices, such as fast turn-on SCR's, are provided to quench the flash to control total flash duration and, accordingly, the total light energy passed into the camera 14. As shown in FIG. 6, each flash tube drive circuit, 104 and 106, is connected to the processor 102 by a 'charge level' signal line, a 'trigger flash' line for firing the respective flash tube 70, and a 'flash quench' line for turning the flash tube 70 off.

In order to produce an internegative from a slide "S", the operator places the slide "S" upon the slide support ledge 40 of the light screen 16. With the lamp 46A (FIG. 3) illuminating the rear of the light screen 16 and back-illuminating the slide "S", the operator compares the brightness of the slide "S", including the subject of principal interest, with the exemplary scenes provide in zones 28, 30, 32, 34, and 36 to determine which of the exemplary scenes matches the brightness of the slide "S" most closely and thus determine whether the slide "S" is properly exposed, underexposed by one or two stops, or overexposed by one or two stops. Once the determination has been made, the 'Density Select' switch 22 is rotated to the proper position, viz., 'N' for normal exposure, '+1' or '+2' for overexposed slides, or '−1' or '−2' for underexposed slides. The 'Density Select' switch 22 is preferably of the rotary switch type and provides one-of-five possible digital line conditions to the processor 102 to indicate the exposure level. As can be appreciated, other user-operated switches or interfaces can be used to input the contrast select information. Thereafter, the slide "S" is removed from the ledge 40 and inserted through the slide access slot 12B into the slide holder 50 (FIG. 4) where the slide "S" is centered at the proper position above the base plate 42. Thereafter, the operator depresses the 'Expose' switch 24 to initiate the exposure sequence of FIGS. 7A and 7B. If desired and as explained below, the operator can also depress the 'Contrast Inhibit' switch 20 to inhibit contrast correction of the resulting internegative.

Figure 7A:
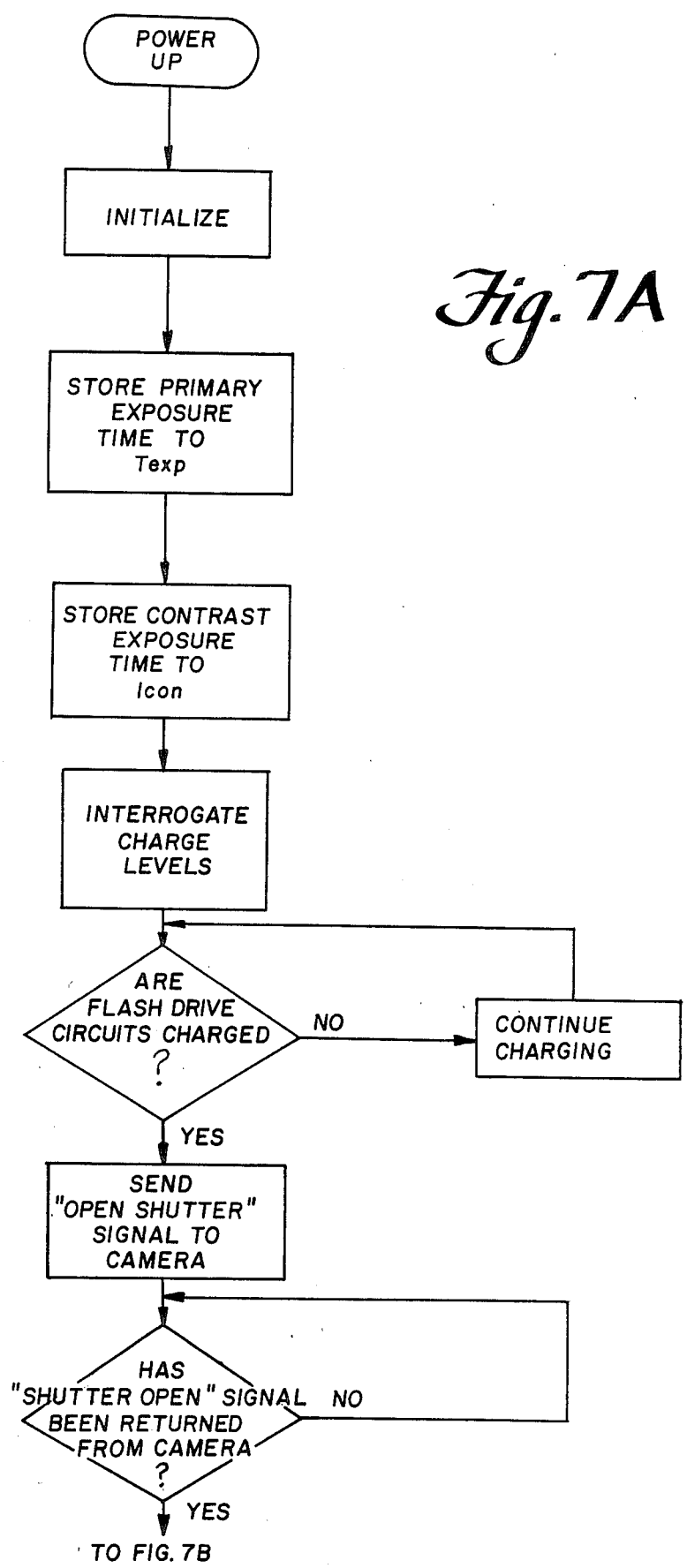
FIG. 7A and FIG. 7B are flow diagrams illustrating the manner by which the stored program controlled processor of FIG. 6 controls the primary and secondary photoflash units and the camera component of the internegative apparatus.
Figure 7B:
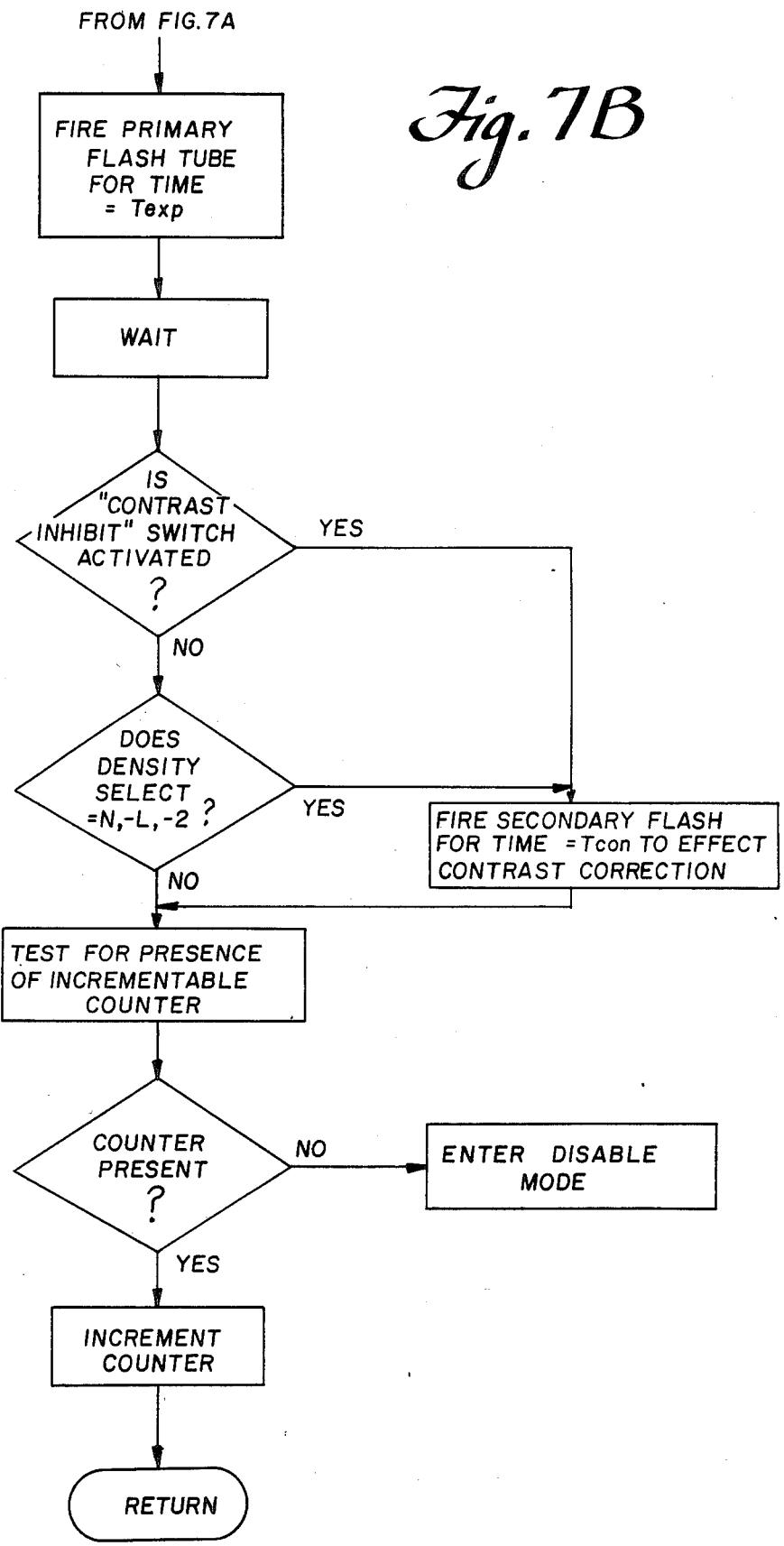

As shown in FIGS. 7A and 7B, the processor 102, after power-up and initialization, interrogates the 'Density Select' switch 22 and stores the value (that is, the value representative of a +2, +1, N, −1, or −2 relative brightness) to a memory location. A time duration value for the primary exposure $T_{exp}$ is then stored to a memory location, and a time duration value for the secondary contrast correcting exposure $T_{con}$ is likewise stored to a memory location. The secondary contrast correcting exposure duration $T_{con}$ is typically fixed at 0.067 milliseconds (ms) while the primary exposure duration $T_{exp}$ varies as function of the position of the 'Density Select' switch 22 as presented in the table below. The values presented have been empirically determined as appropriate for conventional ISO 100 negative film.

TABLE

| DENSITY SELECT | EXPOSURE DURATION $T_{exp}$ |
| --- | --- |
| +2 | 4.0 ms |
| +1 | 1.0 ms |
| N | 0.25 ms |
| −1 | 0.125 ms |
| −2 | 0.067 ms |

The 'charge level' signal lines of the primary and secondary flash tube drive circuits 104 and 106 are then interrogated to determine if the charge level for these circuits is at the desired level. If the charge state is below the desired level, the control sequence loops until the desired charge level is attained. The 'Expose' switch 24 is then interrogated until an ON state is detected. The processor 102 then issues a 'OPEN SHUTTER' command to the camera 14 and then waits for the 'SHUTTER OPEN' verification command to be returned from the camera 14. In general, the camera 14 is pre-set for an automatic exposure cycle of 1/60 second with an F/8 aperture, this exposure duration sufficient to allow operation of the primary and secondary photoflash units 52 and 54. Once the 'SHUTTER OPEN' signal from the camera 14 is sensed, the processor 102 triggers the primary light mixing unit 52 for a time duration equal to the stored value of $T_{exp}$, which is functionally dependent upon the selected density value as described above. The light exiting the exit panel 72 of the primary light mixing unit 52 passes through the slide "S" mounted in the slide holder 50, the reflector plate 56, the lens 14A, and the opened shutter into the camera 14 where the internegative film is exposed. Since the reflector plate 56 is preferably fabricated from coated transparent glass, as described above, image degradation is minimal. At the conclusion of the primary exposure and a short wait cycle, the 'Contrast Inhibit' switch 20 is interrogated and, if the switch 20 has not been actuated by the operator, the secondary flash drive circuit 106 is triggered by the processor 102 for the $T_{con}$ exposure duration, typically 0.067 ms, to compensate for the contrast increasing effect that occurs during the exposure of the internegative. Where the 'Contrast Inhibit' switch 20 has been actuated, the contrast select status is determined and, where the contrast select status is +2 or +1, the secondary flash is skipped, and, where the contrast select status is N, −1, or −2, the secondary exposure is performed as described above. For most photographic scenes the 'Contrast Inhibit' switch 20 is not actuated, but where a higher contrast internegative is desired, for example, when copying advertising materials, display charts, and the like, the contrast correction is normally not desired and the 'Contrast Inhibit' switch 20 is actuated. At the conclusion of the primary and secondary exposures, or the primary exposure only under the conditions described, the processor 102 tests for the presence of the incrementable counter 26, for example, by measuring for the presence of a voltage level, and, if the counter 26 is determined to be in circuit, a 'COUNT 1' signal is sent to increment the counter 26. Where the processor 102 can not confirm the presence of the counter 26, for example, where the internegative apparatus 10 has been tampered with by removal of the counter 26, the processor 102 enters a disable mode to prevent further operation. In the usual situation where the counter 26 is incremented, the processor 102 then returns to the beginning of the sequence for the next operating cycle.

As can be appreciated from the above, the present invention provides an apparatus for producing internegatives which is relatively compact and yet allows a relatively unskilled operator to consistently produce properly exposed internegatives in a cost and time efficient manner.

Thus it will be appreciated from the above that as a result of the present invention, a highly effective apparatus for producing internegatives is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. An apparatus for producing an internegative, comprising:
    means for positioning a transparency from which an internegative is to be made;
    camera means having a selectively controllable shutter for exposing film therein with an image of a transparency positioned by said first-mentioned means;
    first illumination means selectively controllable to project light for a selected time duration through the transparency and into said camera means to expose film in said camera means with an image of the transparency;
    second illumination means selectively controllable to project light for a selected time duration into said camera means to expose film therein; and
    stored-program controlled means coupled to said camera means and said first and second illumination means for selectively opening said shutter and controlling said first illumination means to project light therefrom through said transparency and into said camera means for a selected time duration and for selectively controlling said second illumination means to project light therefrom for a selected time duration into said camera means to effect a contrast correction of the exposed film.

2. The apparatus of claim 1, further comprising: control means selectively operable to inhibit operation of said second illumination means.

3. The apparatus of claim 1, further comprising: means defining a reflector interposed between said camera means and said positioning means and through which light from said first illumination means passes into said camera means.

4. The apparatus of claim 3, wherein light from said second illumination means is reflected by said reflector means into said camera means.

5. The apparatus of claim 4, wherein said reflector means comprises a light-transparent plate.

6. The apparatus of claim 1, wherein each of said first and second illumination means comprises a selectively triggerable photoflash tube.

7. The apparatus of claim 6, wherein said first and second illumination means each further comprise a light exit panel through which light from said photoflash tube passes.

8. The apparatus of claim 7, wherein said first and second illumination means each further comprise a housing for mounting said photoflash tube and said light exit panel said housing configured so light from said photoflash tube does not directly irradiate said light exit panel.

9. The apparatus of claim 8, wherein said light exit panel is fabricated from a translucent, light diffusing material.

10. The apparatus of claim 9, wherein said light exit panel of said second illumination means comprises a first panel fabricated from a translucent, light diffusing material and a second panel fabricated from a light absorbing material to attenuate the intensity of light transmitted through said first panel.

11. The apparatus of claim 1, wherein said means for positioning comprises:
a bracket having spaced guides each with a groove for supporting a side edge of a transparency.

12. The apparatus of claim 1, wherein said means for positioning comprises:
a bracket having spaced apart, resiliently mounted guide means each with a groove for supporting a side edge of a transparency.

13. An apparatus for producing an internegative, comprising:
means for comparing the brightness of a transparency from which an internegative is to be made to a plurality of reference brightness levels to determine the relative brightness of the transparency;
electrical input means for establishing a signal representative of the relative brightness;
camera means having a selectively controllable shutter for exposing film therein to an image of the transparency;
means for positioning the transparency from which an internegative is to be made relative to said camera means to present an image thereof to said camera means;
first illumination means selectively controllable to project light for a selected time duration through the transparency and into said camera means to expose film in said camera means with an image of the transparency;
second illumination means selectively controllable to project light for a selected time duration into said camera means to expose film therein; and
stored-program controlled means coupled to said camera means and said first and second illumination means for selectively opening said shutter and controlling said first illumination means to project light therefrom through said transparency and into said camera means for a selected time duration dependent upon said relative brightness signal and for selectively controlling said second illumination means in response to said relative brightness signal to project light therefrom for a selected time duration into said camera to effect a contrast compensation of the exposed film.

14. The apparatus of claim 13, wherein said brightness comparison means comprises:
a light transmitting panel having a plurality of zones of different light transmitting scenes; and
illumination means for back-illuminating said light transmitting panel so said plural zones present scenes of different brightness.

15. The apparatus of claim 14, further comprising: control means selectively operable to inhibit operation of said second illumination means.

16. The apparatus of claim 14, further comprising: means defining a reflector interposed between said camera means and said positioning means and through which light from said first illumination means passes into said camera means.

17. The apparatus of claim 16, wherein light from said second illumination means is reflected by said reflector means into said camera means.

18. The apparatus of claim 17, wherein said reflector means comprises a light-transparent plate.

19. The apparatus of claim 13, wherein each of said first and second illumination means comprises a selectively triggerable photoflash tube.

20. The apparatus of claim 19, wherein said first and second illumination means each further comprise a light exit panel through which light from said photoflash tube passes.

21. The apparatus of claim 20, wherein said first and second illumination means each further comprise a housing for mounting said photoflash tube and said light exit panel and configured so light from said photoflash tube does not directly irradiate said exit light panel.

22. The apparatus of claim 21, wherein said light exit panel is fabricated from a translucent, light diffusing material.

23. The apparatus of claim 21, wherein said light exit panel of said second illumination means comprises a first panel fabricated from a translucent, light diffusing material and a second panel fabricated from a light absorbing material to attenuate the intensity of light transmitted through said first panel.

24. The apparatus of claim 13, wherein said means for positioning comprises:
a bracket having spaced guides each with a groove for supporting a side edge of a transparency.

25. The apparatus of claim 13, wherein said means for positioning comprises:
a bracket having spaced guides each with a groove for resiliently supporting a side edge of a transparency.

* * * * *